United States Patent
Pei et al.

(10) Patent No.: US 11,069,021 B2
(45) Date of Patent: Jul. 20, 2021

(54) MECHANISM FOR PROVIDING MULTIPLE SCREEN REGIONS ON A HIGH RESOLUTION DISPLAY

(71) Applicant: INTEL CORPORATION, Santa Clara, CA (US)

(72) Inventors: Dingyu Pei, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/305,865

(22) PCT Filed: Jul. 2, 2016

(86) PCT No.: PCT/CN2016/088258
§ 371 (c)(1),
(2) Date: Nov. 29, 2018

(87) PCT Pub. No.: WO2018/006192
PCT Pub. Date: Jan. 11, 2018

(65) Prior Publication Data
US 2019/0295210 A1    Sep. 26, 2019

(51) Int. Cl.
*G06T 11/00*    (2006.01)
*G06T 1/20*    (2006.01)
(Continued)

(52) U.S. Cl.
CPC ............. *G06T 1/20* (2013.01); *G09G 5/006* (2013.01); *G09G 5/14* (2013.01); *G09G 5/363* (2013.01)

(58) Field of Classification Search
CPC . G06T 1/20; G09G 5/006; G09G 5/14; G09G 5/363
See application file for complete search history.

(56) References Cited

U.S. PATENT DOCUMENTS 5,606,707 A *   2/1997  Tomassi ................ G06F 9/3877
                                            345/418
6,999,104 B2    2/2006  Komagata
                        (Continued)

FOREIGN PATENT DOCUMENTS

CN    103220478       7/2013
CN    103220478 A     7/2013
                (Continued)

OTHER PUBLICATIONS

State IP Office of the PR China—International Search Report of the International Searching Authority for International Application No. PCT/CN2016/088258 dated Apr. 11, 2017, 3 pgs.
(Continued)

*Primary Examiner* — Sarah Lhymn
(74) *Attorney, Agent, or Firm* — Hanley, Flight & Zimmerman, LLC

(57) ABSTRACT

A display engine comprises a surface splitter to generate frame buffer coordinates to split frame buffer data into a plurality of regions, each corresponding to a frame buffer coordinate, a pipeline, including a plurality of pipes, to receive the frame buffer coordinates, wherein two or more of the plurality of pipes operate in parallel to process frame buffer data corresponding to a region of the frame buffer identified by the frame buffer coordinates, a first of a plurality of transcoders to merge the frame buffer data from each of the two or more pipes into an output signal whenever the display engine is operating in a multi-pipe collaboration mode and a multiplexer (Mux) and multi-stream arbiter to control an order of transmission of the frame buffer data from each of the two or more pipes to the first transcoder based on a fetch order received from the surface splitter.

25 Claims, 5 Drawing Sheets

(51) Int. Cl.
*G09G 5/00* (2006.01)
*G09G 5/14* (2006.01)
*G09G 5/36* (2006.01)

(56) References Cited

U.S. PATENT DOCUMENTS

| | | |
|---|---|---|
| 7,978,768 B2 | 7/2011 | Koto |
| 2008/0285652 A1* | 11/2008 | Oxman ............... H04N 19/61 375/240.16 |
| 2012/0008002 A1* | 1/2012 | Bigioi ............... G06T 1/20 348/222.1 |
| 2012/0098864 A1* | 4/2012 | Chowdhry ............ G09G 5/14 345/660 |
| 2013/0083843 A1 | 4/2013 | Bennett |
| 2014/0362094 A1 | 12/2014 | Khatod et al. |
| 2015/0084970 A1* | 3/2015 | Schaub ............... H04N 19/61 345/506 |
| 2015/0371607 A1 | 12/2015 | Holland et al. |
| 2016/0125567 A1 | 5/2016 | Yoon et al. |
| 2019/0020877 A1* | 1/2019 | Yamato ............... H04N 19/70 |

FOREIGN PATENT DOCUMENTS

| | | |
|---|---|---|
| JP | 2002099272 A | 4/2002 |
| JP | 2003078856 A | 3/2003 |
| JP | 2003288071 A | 10/2003 |
| JP | 2007096800 A | 4/2007 |

OTHER PUBLICATIONS

State IP Office of the PR China—Written Opinion of the International Searching Authority for International Application No. PCT/CN2016/088258 dated Apr. 11, 2017, 4 pgs.

International Preliminary Report on Patentability received for PCT Patent Application No. PCT/CN2016/088258, dated Jan. 17, 2019, 6 pages.

Japan Patent Office, "Notice of Reasons for Refusal", issued in connection with Japanese Application No. 2018-553383, dated Sep. 1, 2020, 7 pages.

Japanese Patent Office, "Notice of Reasons for Refusal," dated Jun. 1, 2021 in connection with Japanese Patent Application No. 2018-553383, 5 pages (including English translation).

* cited by examiner

MECHANISM FOR PROVIDING MULTIPLE SCREEN REGIONS ON A HIGH RESOLUTION DISPLAY

CROSS-REFERENCE TO RELATED APPLICATIONS

This patent application is a U.S. National Phase application under 35 U.S.C. § 371 of International Application No. PCT/CN2016/088258, filed Jul. 2, 2016, entitled "A MECHANISM FOR PROVIDING MULTIPLE SCREEN REGIONS ON A HIGH RESOLUTION DISPLAY", the contents of which are incorporated herein by reference.

FIELD

The present disclosure generally relates to display engines for high resolution display devices.

BACKGROUND 8K resolution or 8K UHD is currently the highest ultra high definition television (UHDTV) resolution in digital television and digital cinematography. 8K refers to the horizontal resolution in the order of 8,000 pixels, forming the total image dimensions of (7680×4320). 8K UHD has two times the horizontal and vertical resolution of the 4K UHD, with four times as many pixels overall, or sixteen times as many pixels as Full HD. High-resolution displays such as 8K enable a user to have each pixel be indistinguishable to the human eye from an acceptable distance to the screen.

The demand for 8K, and even higher resolution display (e.g., 16K) support poses new challenges to display engine designers to meet quality, power consumption, as well as other requirements. For instance, in current display engine design, single high-resolution screen is commonly driven by one pipeline (e.g., one-pipe-plus-one-transcoder pipeline), which requires the pipe and a transcoder to both work at a very high frequency. One known exception is Multi-Stream Transport (MST) in the DisplayPort ver.1.2 interface, developed by the Video Electronics Standards Association (VESA), which treats the single screen as the combination of several smaller screen regions and requires a full one-pipe-plus-one-transcoder pipeline to account for each of the screen regions. However, MTS typically suffers from tricky synchronization issues while merging multiple screen regions into one single display, and may not operate if applications are not multi-screen aware.

DETAILED DESCRIPTION

A multi-pipe collaboration display engine is described. In some embodiments, the design and operation of components such as a graphics logic component and display engine, and/or components of a central processing unit, may be altered to modify data frame rendering and transmission of data frames to a display panel. These changes may entail changes in power management hooks that achieve power saving such as power managing of a display interface when no update is required.

Figure 1A:
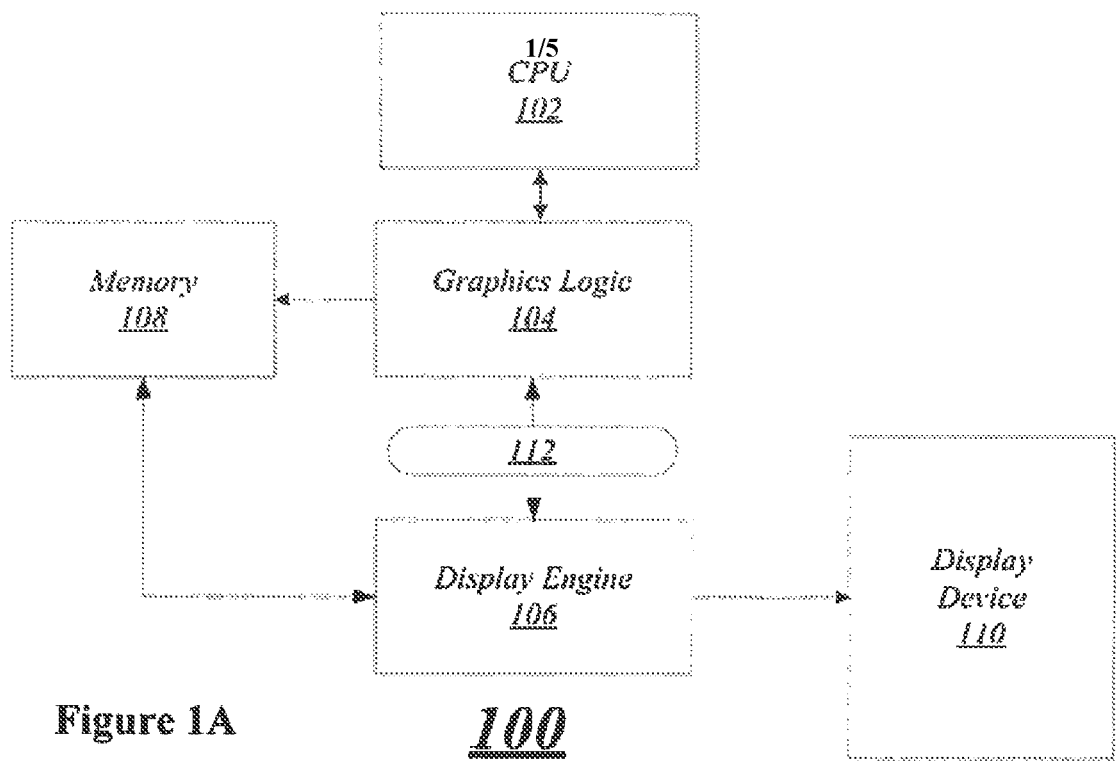
FIGS. 1A & 1B illustrate block diagrams of embodiments of a system.

FIG. 1A illustrates one system 100 consistent with the present embodiments. The system 100 includes a central processing unit (CPU) 102, graphics logic 104, display engine 106, memory 108, and display device 110. An interface 112 may couple the graphics logic 104 and display engine 106. In some embodiments, the system 100 may be embodied in a mobile device such as a laptop computer, tablet computing device, desktop computer, smartphone, or other electronic computing device or communications device. The embodiments are not limited in this context.

In particular, in various embodiments the CPU 102, graphics logic 104, and/or display engine 106 may include various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The system 100 may execute communications operations or logic to process data received from various sources for presentation on a display, such as display device 110. The data may comprise media content such as video content or other images to be presented in succession on display device 110. Examples of a display device 110 include a liquid crystal display (LCD), light emitting diode display (LED), touch sensitive display, plasma display, cathode ray tube, and other display types. In one embodiment, device 110 is a super high-resolution display (e.g., 8K or 16K resolution).

In various embodiments, the system 110 may include various input devices (not shown) including, but not limited to, keyboards, microphones, mouse, joystick or other navigation devices, and so forth. The user may use such input devices to select media files from one or more media sources (not shown) for viewing on display device 110.

In other embodiments, the data for processing may be received from a digital medium or digital media. A source for digital media may be a digital camera, digital video device, smartphone, tablet computing device, computer, or other device that contains one or more media files that a user or users may wish to view on the display device 110. Other examples of media sources include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, video surveillance system, teleconferencing system, telephone system, wearable computers, portable media players (PMP), portable media recorders (PMR), digital media servers and so forth. The embodiments are not limited in this context. In further embodiments, a digital medium may be a data source that constitutes a combination of hardware elements such as a processor and memory that generates image data periodically, such as machine-generated animation.

It is to be noted that a media source may include data to be presented in audio format as well as visual format. Consistent with the present embodiments, the display device 110 or other devices (not shown) linked to display device 110 may be operative to output audio signals based on digital media content whose images are presented on display device 110.

In various embodiments, the digital media whose content is to be presented on the display device 110 may be a DVD or other medium in which the native frame rate differs from the refresh rate employed by the display device 110. As detailed in the figures to follow, components of system 100 including, among others, graphics logic 104, display engine 106, interface 112, and memory 108, may be interoperable to adjust the processing of media content for presentation on display 110. The media content may be received as streaming data such as video data that is temporarily stored in system 100 while being processed to be shown on display 110. The adjustments in processing of data may include adjusting the timing for storing data in memory 108, for fetching data from memory 108, and transmitting the data to display device 110. As an example, an interface 112, which may be distributed as software, hardware, or a combination of hardware and software between graphics logic 104 and display engine 106, may facilitate handshaking between the graphics logic 104 and display engine 106 to steer new data for streaming to the display device 110.

Figure 1B:
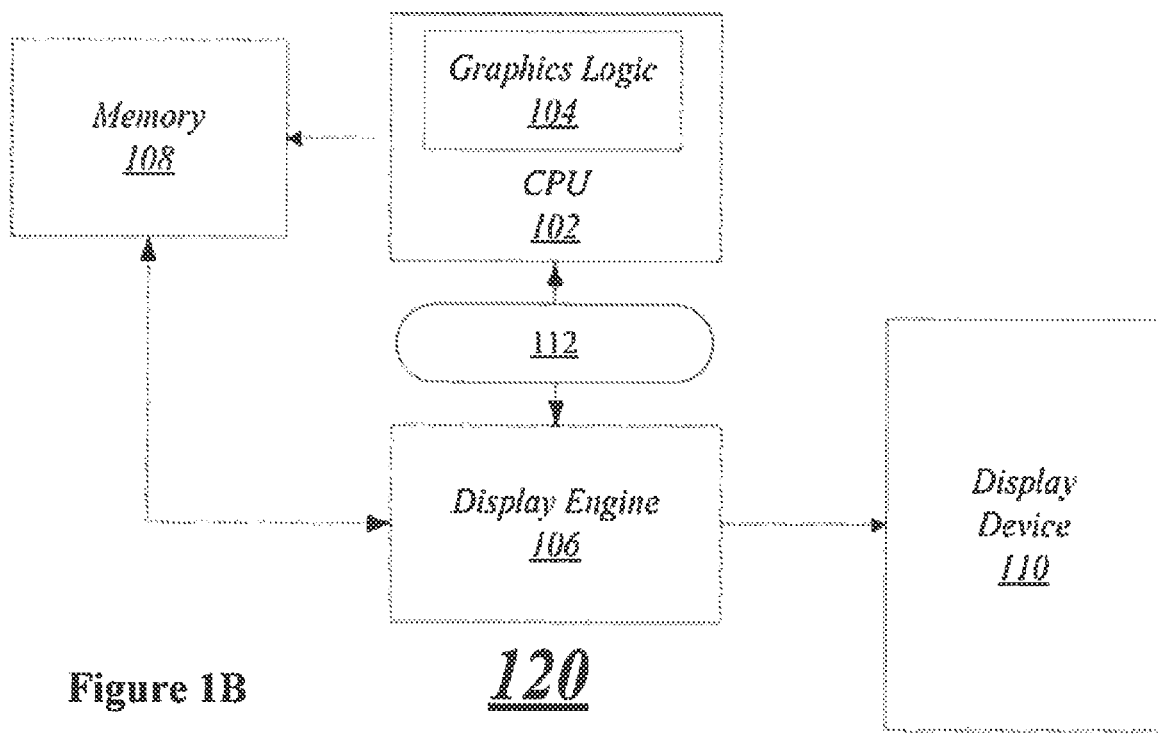

FIG. 1B illustrates an embodiment of a system 120 consistent with the present embodiments. The system 120 may include generally similar components as system 100. As illustrated in system 120, graphics logic 104 may be included in the CPU 102. In one particular variant, the CPU 102 may be a "system on a chip" (SOC) component that includes one or more general processors and the graphics logic 104 on a single silicon chip.

Figure 2:
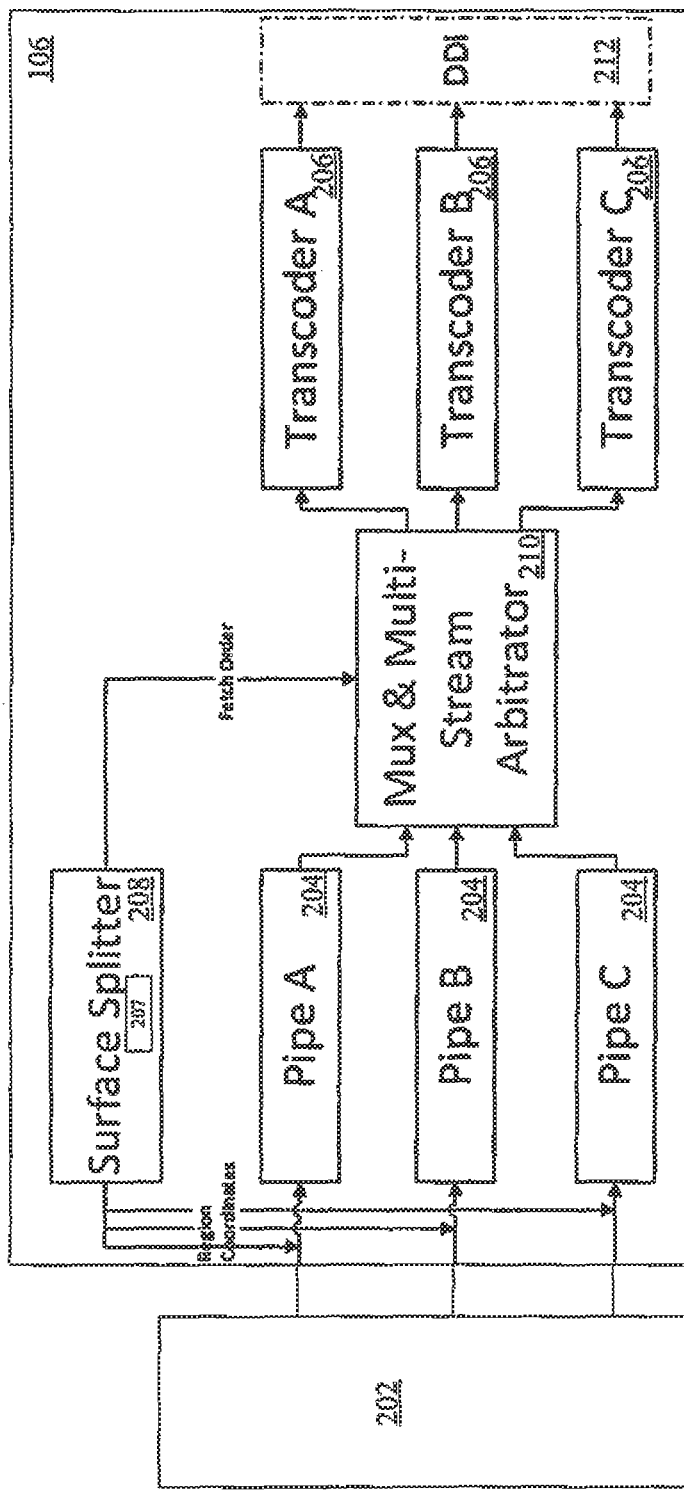
FIG. 2 illustrates one embodiment of a display engine.

FIG. 2 illustrates one embodiment of a display engine 106. Display engine 106 facilitates the display of data at display device 110. In one embodiment, display engine 106 is coupled to a memory 202 and includes a multi-pipe (e.g., A, B and C) pipeline 204, transcoders (e.g., A, B and C) 206 and digital display interface (DDI) 212. According to one embodiment, display engine 106 implements a multi-pipe collaboration mode that offers flexibility, via an adjustable split policy, for a very high-resolution display 110. In such an embodiment, display engine 106 implements multi-pipe pipeline 204, which includes a "virtual pipe" and a transcoder 206, to drive a single high-resolution display 110.

As shown in FIG. 2, a "virtual pipe" is an aggregation of multiple pipes (e.g., A, B and C), which operate in parallel to each process one designated region of a high definition frame buffer stored in memory 202. In this embodiment, outputs of the pipes are combined as the output of the "virtual pipe" and streamed through one transcoder 206 to present to display 110 via DDI 212. To accomplish such an embodiment, a surface splitter 208, Multiplexer (Mux) and multi-stream arbiter 210 are included.

Surface splitter 208 splits an entire frame buffer into several smaller regions by generating coordinates of each region and feeding the coordinates to pipes in pipeline 204. In one embodiment, surface splitter includes registers 207, which receives configuration information (e.g., a split policy) from a display driver (not shown) indicating how to split the frame buffer, and the number of pipes to be involved in the collaboration.

Mux and multi-stream arbiter 210 follows a fetch order received from surface splitter 208 to control the order in which pipeline 204 pipes are to be transmitted to transcoder 206. In one embodiment, registers 207 in surface splitter store the fetch order. In a further embodiment, Mux and multi-stream arbiter 210 operates as a common Mux to connect one pipe in pipeline 204 with one transcoder 206 when a multi-pipe collaboration mode is disabled.

Figure 3:
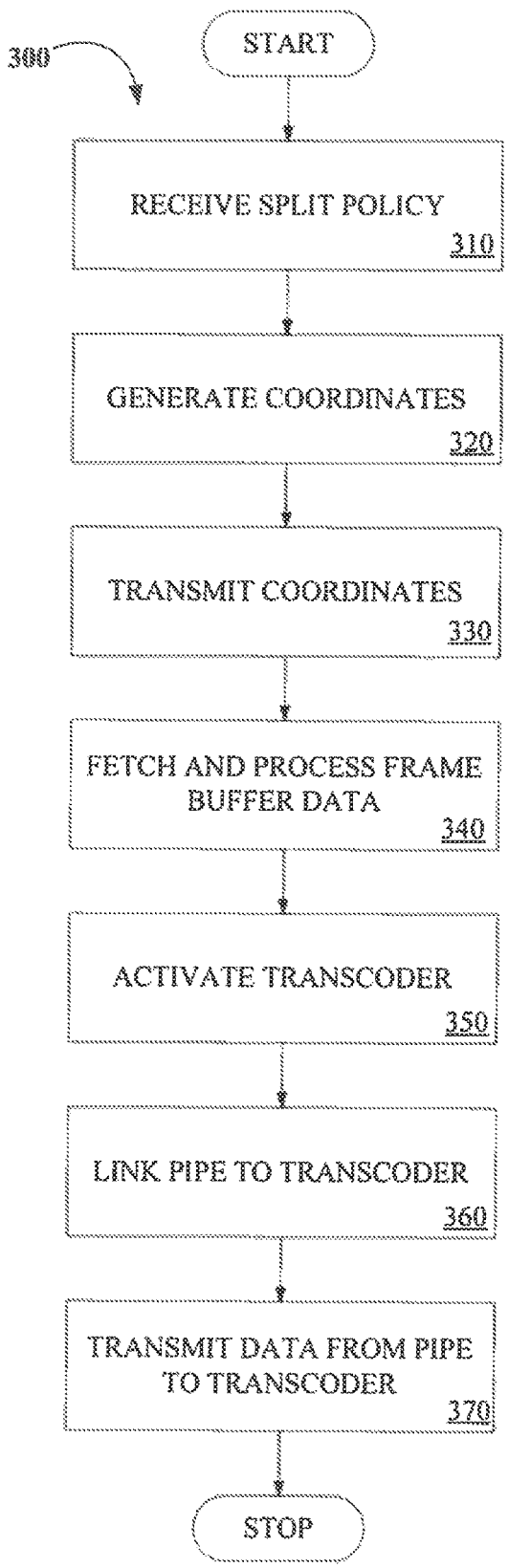
FIG. 3 illustrates one embodiment of a process for merging multiple screen regions on a display.

FIG. 3 illustrates one embodiment of a method 300 for merging multiple screen regions on a single high resolution, or super high resolution, display. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. For brevity, many of the details discussed with reference to the preceding figures may not be discussed or repeated hereafter.

Figure 4A:
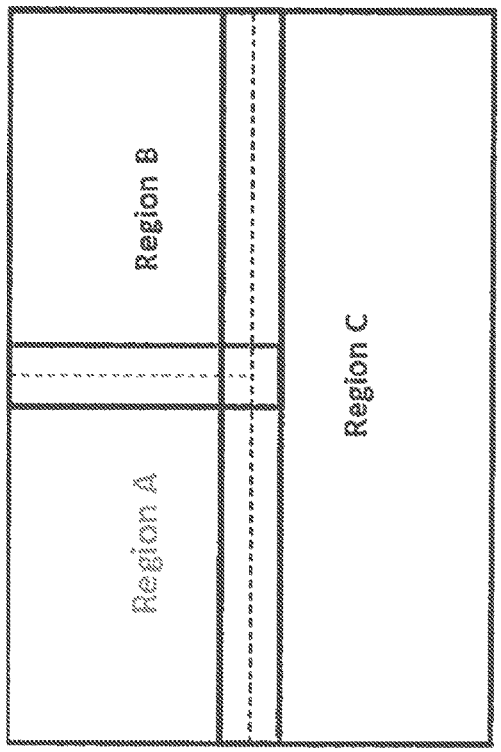
FIGS. 4A-4B illustrate embodiments of split policies.
Figure 4B:
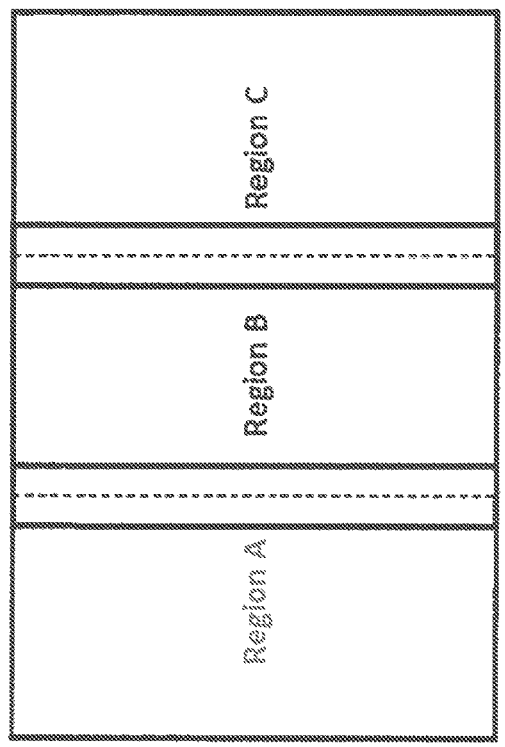

At processing block 310, a split policy is received. In one embodiment, the split policy determines the number of regions in which the frame buffer is to be split (e.g., the number of pipes to be involved in the collaboration) and how the frame buffer is split. In such an embodiment, surface splitter 208 receives the split policy from the display driver, which programs the policies based on the capabilities of the pipes in pipeline 204. FIGS. 4A & 4B illustrate embodiments of a frame buffer split using the three-pipe pipeline 204 collaboration embodiment for a 8K display. FIG. 4A discloses an embodiment of a divided-by-two split shown that takes advantage of implementation of a divided-by two and/or fits well for a display engine 106 with a more powerful pipe 204C. FIG. 4B discloses an embodiment of an equal split that approximately evenly distributes the workload between the three pipes in pipeline 204.

In a further embodiment, additional split policy rules are to be considered. For instance, the borders of the regions should not be the bisector or trisector (e.g., the dashed lines in FIGS. 4A & 4B) if the processing feature (e.g., scaling), with an algorithm entailing the value of adjacent pixels, is enabled for the pipe. Instead, the borders of the regions are extended to cover the adjacent pixels (as illustrated by the rectangles in FIGS. 4A & 4B). Thus, regions will slightly overlap, with the pipe cropping the auxiliary pixels that will not be includes in the output.

Figure 5:
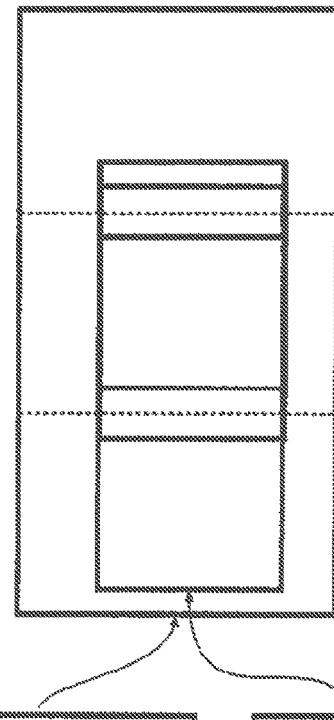
FIG. 5 illustrate an embodiment of a split with multiple planes.
Figure 5:
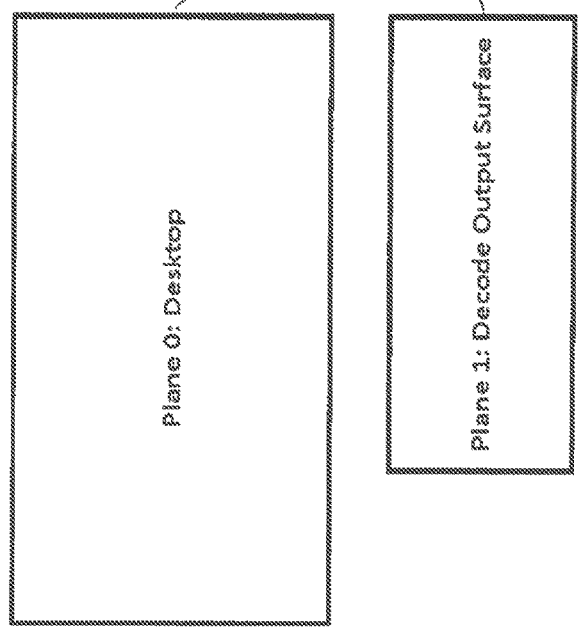

If multiple planes are activated in one pipe, the split of each plane's source buffer follows the split policy of the main frame buffer. As shown in FIG. 5, an equal split is applied to both plane 0 (main frame buffer) and plane 1 (decoder output surface). Plane 1 in each of the three pipes will take the rectangles to process and composite with other planes within the single pipe. In further embodiment, fine-tuning the split policy may achieve the best performance and power ratio for various scenarios.

Referring back to FIG. 3, surface splitter 208 generates the coordinates and the fetch order for all the split regions based on the configured split policy, processing block 320. At processing block 330, surface splitter 208 transmits the coordinates to one or more of the pipeline 204 pipes. At processing block 340, each pipe to be involved in the co-display fetches frame buffer data in the designated region from memory 202 and process the data (e.g., blending, scaling, etc.) according to its register configuration. Based on the fetch order indicated by surface splitter 208, a transcoder 206 (e.g. Transcoder A in FIG. 2) is activated and connected with multi-stream arbitrator 210, processing block 350. At processing block 360, multi-stream arbitrator 210 loops to link the pipes with the transcoder 206 in the specified fetch order, one pipe at a time. At processing block 370, the output of each involved pipe in pipeline 204 is transmitted to the transcoder 206 and merged into the output signal via DDI 212.

Figure 6:
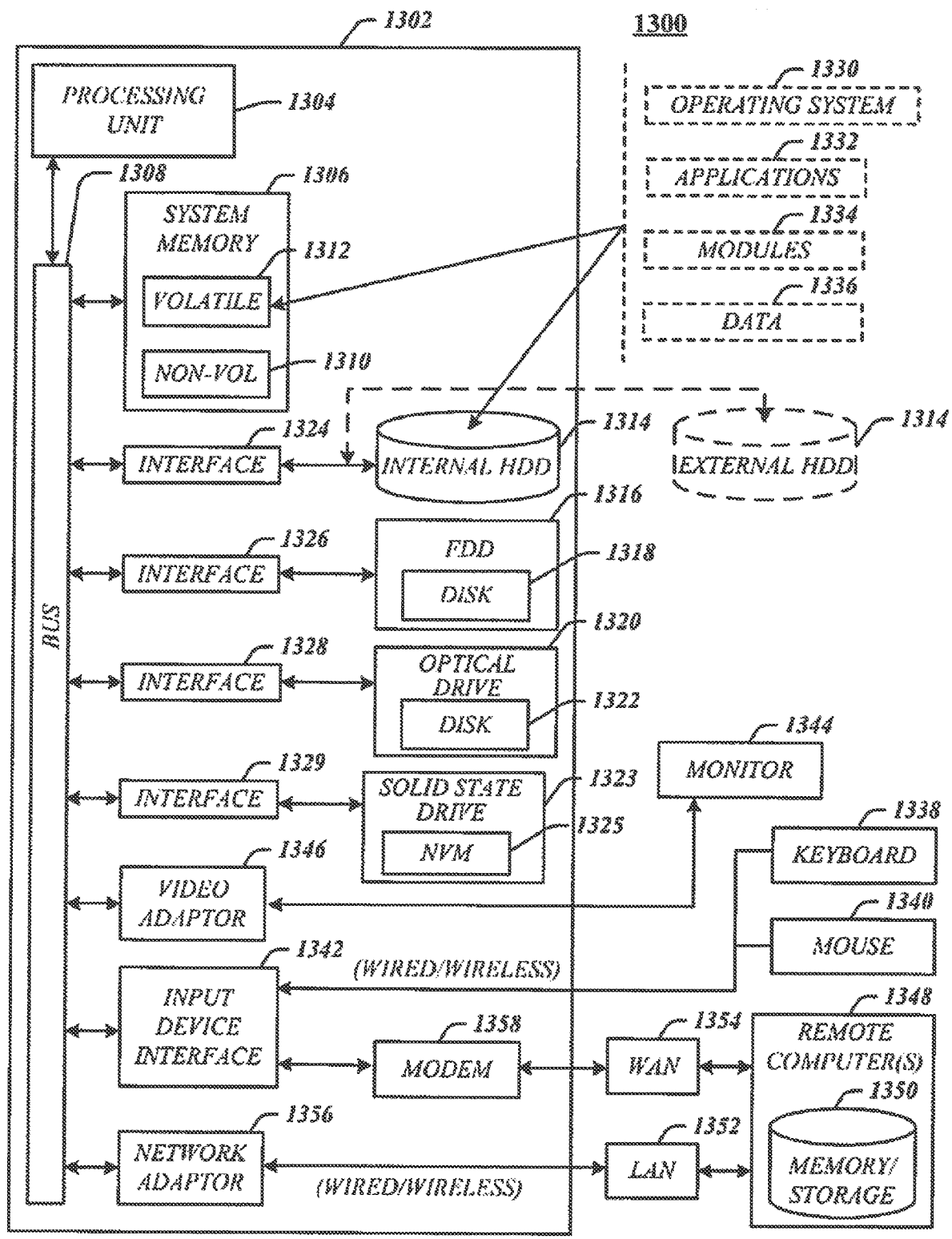
FIG. 6 illustrates one embodiment of a computing architecture.

FIG. 6 illustrates an embodiment of an exemplary computing architecture 1300 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 6, the computing architecture 1300 comprises a processing unit 1304, a system memory 1306 and a system bus 1308. The processing unit 1304 can be any of various commercially available processors. Dual microprocessors and other multi-processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD); and a solid state drive (SSD) 1323 to read or write data to/from a non-volatile memory (NVM) 1325, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 1314, FDD 1316, optical disk drive 1320, and solid state drive 1323 can be connected to the system bus 1308 by a HDD interface 1324, an FDD interface 1326, an optical drive interface 1328, and a solid state drive interface 1329, respectively. The HDD interface 1324 for external drive implementations can include at least one or both of Universal Serial Bus (USB) and IEEE 1394 interface technologies. The solid state drive interface 1329 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a display engine comprising a surface splitter to generate frame buffer coordinates to split frame buffer data into a plurality of regions, each corresponding to a frame buffer coordinate, a pipeline, including a plurality of pipes, to receive the frame buffer coordinates, wherein two or more of the plurality of pipes operate in parallel to process frame buffer data corresponding to a region of the frame buffer identified by the frame buffer coordinates, a first of a plurality of transcoders to merge the frame buffer data from each of the two or more pipes into an output signal whenever the display engine is operating in a multi-pipe collaboration mode and a multiplexer (Mux) and multi-stream arbiter to control an order of transmission of the frame buffer data from each of the two or more pipes to the first transcoder based on a fetch order received from the surface splitter.

Example 2 includes the subject matter of Example 1, wherein the frame buffer data from the two or more pipes are combined by the Mux and multi-stream arbiter.

Example 3 includes the subject matter of Examples 1 and 2, wherein the surface splitter comprises registers to receive configuration information indicating a split policy, and which of the two or more pipes are to be implemented.

Example 4 includes the subject matter of Examples 1-3, wherein the configuration information is received from a display driver.

Example 5 includes the subject matter of Examples 1-4, wherein the registers further store the fetch order.

Example 6 includes the subject matter of Examples 1-5, wherein the Mux and multi-stream arbiter connects each of the plurality of pipes with a corresponding transcoder when a multi-pipe collaboration mode is disabled at the display engine.

Example 7 includes the subject matter of Examples 1-6, wherein the surface splitter splits the frame buffer data based on the split policy.

Example 8 includes the subject matter of Examples 1-7, wherein the split policy determines a number of regions and a manner in which the frame buffer is to be split.

Some embodiments pertain to Example 9 that includes generating frame buffer coordinates to split frame buffer data into a plurality of regions, each corresponding to a frame buffer coordinate, processing frame buffer data corresponding to separate regions of the frame buffer identified by the frame buffer coordinates in parallel at two or more of a plurality of pipes, controlling an order of transmission of the frame buffer data from each of the two or more pipes to a first transcoder based on a fetch order and merging the frame buffer data into an output signal at the first transcoder.

Example 10 includes the subject matter of Example 9, further comprising each of the two or more of the plurality of pipes fetching the frame buffer data based on the corresponding frame buffer coordinates.

Example 11 includes the subject matter of Examples 9 and 10, receiving a split policy and generating the coordinates based on the split policy.

Example 12 includes the subject matter of Examples 9-11, wherein the split policy determines a number of regions and a manner in which the frame buffer is to be split.

Example 13 includes the subject matter of Examples 9-12, wherein the split policy is received from a display driver.

Some embodiments pertain to Example 14 that includes a display device, digital display interface (DDI) couple to the display device and a display engine, coupled to the DDI, comprising a surface splitter to generate frame buffer coordinates to split frame buffer data into a plurality of regions, each corresponding to a frame buffer coordinate, a pipeline, including a plurality of pipes, to receive the frame buffer coordinates, wherein two or more of the plurality of pipes operate in parallel to process frame buffer data corresponding to a region of the frame buffer identified by the frame buffer coordinates, a first of a plurality of transcoders to merge the frame buffer data from each of the two or more pipes into an output signal whenever the display engine is operating in a multi-pipe collaboration mode and a multiplexer (Mux) and multi-stream arbiter to control an order of transmission of the frame buffer data from each of the two or more pipes to the first transcoder based on a fetch order received from the surface splitter.

Example 15 includes the subject matter of Example 14, wherein the frame buffer data from the two or more pipes are combined by the Mux and multi-stream arbiter.

Example 16 includes the subject matter of Examples 14 and 15, wherein the surface splitter comprises registers to receive configuration information indicating a split policy, and which of the two or more pipes are to be implemented.

Example 17 includes the subject matter of Examples 14-16, wherein the configuration information is received from a display driver.

Example 18 includes the subject matter of Examples 14-17, wherein the registers further store the fetch order.

Example 19 includes the subject matter of Examples 14-18, wherein the Mux and multi-stream arbiter connects each of the plurality of pipes with a corresponding transcoder when a multi-pipe collaboration mode is disabled at the display engine.

Example 20 includes the subject matter of Examples 14-19, wherein the surface splitter splits the frame buffer data based on the split policy.

Example 21 includes the subject matter of Examples 14-20, wherein the split policy determines a number of regions and a manner in which the frame buffer is to be split.

Some embodiments pertain to Example 22 that includes at least one computer-readable medium having instructions, which when executed by one or more processors, cause the one or more processors to perform the method of claims 9-13.

Some embodiments pertain to Example 23 that includes a system comprising means for generating frame buffer coordinates to split frame buffer data into a plurality of regions, each corresponding to a frame buffer coordinate, means for processing frame buffer data corresponding to separate regions of the frame buffer identified by the frame buffer coordinates in parallel at two or more of a plurality of pipes, means for controlling an order of transmission of the frame buffer data from each of the two or more pipes to a first transcoder based on a fetch order and means for merging the frame buffer data into an output signal at the first transcoder.

Example 24 includes the subject matter of Example 23, wherein each of the two or more of the plurality of pipes to fetch the frame buffer data based on the corresponding frame buffer coordinates.

Example 25 includes the subject matter of Examples 23 and 24, further comprising means for receiving a split policy and means for generating the coordinates based on the split policy.

Example 26 includes the subject matter of Examples 23-25, wherein the split policy determines a number of regions and a manner in which the frame buffer is to be split.

Some embodiments pertain to Example 27 that includes at least one computer-readable medium having instructions, which when executed by one or more processors, cause the one or more processors to generate frame buffer coordinates to split frame buffer data into a plurality of regions, each corresponding to a frame buffer coordinate, process frame buffer data corresponding to separate regions of the frame buffer identified by the frame buffer coordinates in parallel at two or more of a plurality of pipes, control an order of transmission of the frame buffer data from each of the two or more pipes to a first transcoder based on a fetch order and merge the frame buffer data into an output signal at the first transcoder.

Example 28 includes the subject matter of Example 27, having instructions, which when executed by the one or more processors, further cause each of the two or more of the plurality of pipes to fetch the frame buffer data based on the corresponding frame buffer coordinates.

Example 29 includes the subject matter of Examples 27 and 28, having instructions, which when executed by the one or more processors, further cause to one or more processors to receive a split policy and generate the coordinates based on the split policy Example 30 includes the subject matter of Examples 27-29, wherein the split policy determines a number of regions and a manner in which the frame buffer is to be split.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A display engine comprising:
a surface splitter to generate frame buffer coordinates to split frame buffer data into a plurality of regions, each corresponding to a frame buffer coordinate;
a pipeline, including a plurality of pipes, to receive the frame buffer coordinates, wherein two or more of the plurality of pipes operate in parallel to process frame buffer data corresponding to a region of the frame buffer identified by the frame buffer coordinates;
a first of a plurality of transcoders to merge the frame buffer data from each of the two or more pipes into an output signal whenever the display engine is operating in a multi-pipe collaboration mode; and
a multiplexer (Mux) and multi-stream arbiter to control an order of transmission of the frame buffer data from each of the two or more pipes to the first transcoder based on a fetch order received from the surface splitter.

2. The display engine of claim 1, wherein the frame buffer data from the two or more pipes are combined by the Mux and multi-stream arbiter.

3. The display engine of claim 1, wherein the surface splitter comprises registers to receive configuration information indicating a split policy, and which of the two or more pipes are to be implemented.

4. The display engine of claim 3, wherein the configuration information is received from a display driver.

5. The display engine of claim 4, wherein the surface splitter splits the frame buffer data based on the split policy.

6. The display engine of claim 5, wherein the split policy determines a number of regions and a manner in which the frame buffer is to be split.

7. The display engine of claim 3, wherein the registers further store the fetch order.

8. The display engine of claim 1, wherein the Mux and multi-stream arbiter connects each of the plurality of pipes with a corresponding transcoder when a multi-pipe collaboration mode is disabled at the display engine.

9. A method comprising:
generating frame buffer coordinates to split frame buffer data into a plurality of regions, each corresponding to a frame buffer coordinate;
processing frame buffer data corresponding to separate regions of the frame buffer identified by the frame buffer coordinates in parallel at two or more of a plurality of pipes;
controlling an order of transmission of the frame buffer data from each of the two or more pipes to a first transcoder based on a fetch order; and
merging the frame buffer data into an output signal at the first transcoder.

10. The method of claim 9, further comprising each of the two or more of the plurality of pipes fetching the frame buffer data based on the corresponding frame buffer coordinates.

11. The method of claim 9, further comprising:
receiving a split policy; and
generating the coordinates based on the split policy.

12. The method of claim 11, wherein the split policy determines a number of regions and a manner in which the frame buffer is to be split.

13. The method of claim 12, wherein the split policy is received from a display driver.

14. A computer system comprising:
a display device;
digital display interface (DDI) couple to the display device; and
a display engine, coupled to the DDI, comprising:
a surface splitter to generate frame buffer coordinates to split frame buffer data into a plurality of regions, each corresponding to a frame buffer coordinate;
a pipeline, including a plurality of pipes, to receive the frame buffer coordinates, wherein two or more of the plurality of pipes operate in parallel to process frame buffer data corresponding to a region of the frame buffer identified by the frame buffer coordinates;
a first of a plurality of transcoders to merge the frame buffer data from each of the two or more pipes into an output signal whenever the display engine is operating in a multi-pipe collaboration mode; and
a multiplexer (Mux) and multi-stream arbiter to control an order of transmission of the frame buffer data from each of the two or more pipes to the first transcoder based on a fetch order received from the surface splitter.

15. The computer system of claim 14, wherein the frame buffer data from the two or more pipes are combined by the Mux and multi-stream arbiter.

16. The computer system of claim 14, wherein the surface splitter comprises registers to receive configuration information indicating a split policy, and which of the two or more pipes are to be implemented.

17. The computer system of claim 16, wherein the configuration information is received from a display driver.

18. The computer system of claim 16, wherein the registers further store the fetch order.

19. The computer system of claim 18, wherein the surface splitter splits the frame buffer data based on the split policy.

20. The computer system of claim 19, wherein the split policy determines a number of regions and a manner in which the frame buffer is to be split.

21. The computer system of claim 14, wherein the Mux and multi-stream arbiter connects each of the plurality of pipes with a corresponding transcoder when a multi-pipe collaboration mode is disabled at the display engine.

22. At least one computer-readable medium having instructions, which when executed by one or more processors, cause the one or more processors to:
   generate frame buffer coordinates to split frame buffer data into a plurality of regions, each corresponding to a frame buffer coordinate;
   process frame buffer data corresponding to separate regions of the frame buffer identified by the frame buffer coordinates in parallel at two or more of a plurality of pipes;
   control an order of transmission of the frame buffer data from each of the two or more pipes to a first transcoder based on a fetch order; and
   merge the frame buffer data into an output signal at the first transcoder.

23. The at least one computer-readable medium of claim 22, having instructions, which when executed by the one or more processors, further cause each of the two or more of the plurality of pipes to fetch the frame buffer data based on the corresponding frame buffer coordinates.

24. The at least one computer-readable medium of claim 22, having instructions, which when executed by the one or more processors, further cause to one or more processors to:
   receive a split policy; and
   generate the coordinates based on the split policy.

25. The at least one computer-readable medium of claim 24, wherein the split policy determines a number of regions and a manner in which the frame buffer is to be split.

* * * * *